US011909160B2

(12) United States Patent
Kao

(10) Patent No.: US 11,909,160 B2
(45) Date of Patent: Feb. 20, 2024

(54) CRIMPING HAND TOOL

(71) Applicant: JETOOL CORP., New Taipei (TW)

(72) Inventor: Yi Ching Kao, New Taipei (TW)

(73) Assignee: JETOOL CORP., New Taipei (TW)

( * ) Notice: Subject to any disclaimer, the term of this patent is extended or adjusted under 35 U.S.C. 154(b) by 564 days.

(21) Appl. No.: 17/167,091

(22) Filed: Feb. 4, 2021

(65) Prior Publication Data

US 2022/0209482 A1 Jun. 30, 2022

(30) Foreign Application Priority Data

Dec. 25, 2020 (TW) ................................ 109146183

(51) Int. Cl.
*H01R 43/042* (2006.01)

(52) U.S. Cl.
CPC ................................ *H01R 43/0421* (2013.01)

(58) Field of Classification Search
CPC ................................................. H01R 43/0421
USPC ............................................................ 7/107
See application file for complete search history.

(56) References Cited

U.S. PATENT DOCUMENTS 5,042,286 A * 8/1991 Wiebe .................. H01R 43/042
72/461
D625,980 S 10/2010 Liu
D729,601 S 5/2015 Lin
D824,739 S 8/2018 Sutter et al.
D836,415 S 12/2018 Lin
10,535,969 B2 * 1/2020 Sutter .................. H01R 43/015
10,666,006 B2 * 5/2020 Lin ...................... H01R 43/015
11,025,024 B2 * 6/2021 Lin ...................... B23D 29/023
(Continued)

FOREIGN PATENT DOCUMENTS

CN 306710338 7/2021
IN 306201348 12/2020
TW D192353 8/2018

OTHER PUBLICATIONS

True Cable, "trueCABLE All-In-One Crimp and Termination Tool, Compatible with Cat5e, Cat6, Cat6A Ethernet RJ45 Connectors, Shielded & Unshielded, Pass Through, and Standard Modular Plugs", product listing on Amazon, first available on May 28, 2020, retrieved on Mar. 22, 2023 from https://a.co/d/esEYcDy, pp. 1-9.
(Continued)

*Primary Examiner* — Hadi Shakeri
(74) *Attorney, Agent, or Firm* — JCIPRNET

(57) ABSTRACT

A crimping hand tool, including a first clamp body and a second clamp body pivotally connected to each other, a driving member, a crimping assembly, and a cable stripping assembly, is provided. The driving member is movably disposed in the second clamp body, with one end pivotally connected to the first clamp body, and another end pivotally connected to the crimping assembly that is movably disposed in the second clamp body. The cable stripping assembly is movably disposed in the second clamp body and is pivotally connected to the crimping assembly. A pivotal axial direction of the first clamp body and the second clamp body, a pivotal axial direction of the driving member and the first clamp body, a pivotal axial direction of the crimping assembly and the driving member, and a connection axial direction of the cable stripping assembly and the crimping assembly are parallel to each other.

14 Claims, 14 Drawing Sheets

(56) References Cited

U.S. PATENT DOCUMENTS

| | | | |
|---|---|---|---|
| D964,834 | S | 9/2022 | Huang |
| 2012/0192410 | A1 | 8/2012 | Lu |
| 2018/0062336 | A1 | 3/2018 | Lin |
| 2019/0181603 | A1 | 6/2019 | Lin |
| 2022/0209482 | A1 | 6/2022 | Kao |

OTHER PUBLICATIONS

"Office Action of U.S. Related Application, U.S. Appl. No. 29/758,847", dated Mar. 30, 2023, p. 1-p. 5.

* cited by examiner

CRIMPING HAND TOOL

CROSS-REFERENCE TO RELATED APPLICATION

This application claims the priority benefit of Taiwan application serial no. 109146183, filed on Dec. 25, 2020. The entirety of the above-mentioned patent application is hereby incorporated by reference herein and made a part of this specification.

BACKGROUND

Technical Field

This disclosure relates to a crimping hand tool.

Description of Related Art

Currently, various types of signal wires and signal connectors are widely used in signal transmission, such as network cables and RJ45 connectors configured to transmit network signals, and telephone lines and RJ11 connectors configured to transmit telephone signals. In order to connect a wire to a required equipment, a terminal end of the wire is usually connected to a corresponding connector to form a cable connector. At this time, a specific wire crimping tool is required to connect and fix the wire and the connector to each other.

In general, the processing of the cable connector often requires relevant hand tools to assemble the components of the cable connector together. Existing hand tools for assembly are unable to integrate all that are required in the processing of the cable connector, and there is a lack of hand tools that can provide sufficient functionality, therefore the processing efficiency of assembling the cable connector by the user cannot be improved accordingly.

SUMMARY

This disclosure provides a crimping hand tool, which integrates multiple processing mechanisms in a single-piece hand tool, reduces burden of a user during operation of the crimping hand tool and improves processing efficiency of binding a cable to a connector.

A crimping hand tool of the disclosure includes a first clamp body, a second clamp body, a driving member, a crimping assembly, and a cable stripping assembly. The first clamp body is pivotally connected to the second clamp body. The driving member is movably disposed in the second clamp body, and one end of the driving member is pivotally connected to the first clamp body. The crimping assembly is movably disposed in the second clamp body and is pivotally connected to another end of the driving member. The cable stripping assembly is movably disposed in the second clamp body and is pivotally connected to the crimping assembly. A pivotal axial direction of the first clamp body and the second clamp body, a pivotal axial direction of the driving member and the first clamp body, a pivotal axial direction of the crimping assembly and the driving member, and a connection axial direction of the cable stripping assembly and the crimping assembly are parallel to each other. The crimping assembly and the cable stripping assembly are driven by the driving member to slide in a same direction when the first clamp body and the second clamp body pivot relative to each other.

In an embodiment of the disclosure, the cable stripping assembly includes a pair of abutting members, a cable peeler, and an elastic member. The abutting members are slidably disposed in a slot of the second clamp body, and one of the abutting members is pivotally connected to the crimping assembly. The cable peeler is embedded in one of the abutting members. The elastic member is disposed on a movement path of the abutting members. The crimping assembly is pushed by the driving member through pivoting of the first clamp body and the second clamp body relative to each other, and the abutting members are driven to move closer to each other after a cable which is adapted to be inserted into the slot is inserted into the slot, so as to enable the cable to be clamped between the abutting members.

In an embodiment of the disclosure, the elastic member abuts between one of the abutting members and the second clamp body.

In an embodiment of the disclosure, the elastic member abuts between one of the abutting members and the crimping assembly.

In an embodiment of the disclosure, the elastic member abuts between the abutting members.

In an embodiment of the disclosure, the crimping assembly includes a pair of first crimping members, which are movably disposed in another slot of the second clamp body, and are pivotally connected to the other end of the driving member coaxially. One of the abutting members is pivotally connected to in-between of the first crimping members.

In an embodiment of the disclosure, the crimping assembly further includes a cable cutter, which is assembled on one of the first crimping members, and the first crimping member assembled with the cable cutter is located between the cable cutter and the abutting member.

In an embodiment of the disclosure, the crimping assembly further includes a crimping head, which is adjustably assembled on one of the first crimping members along a crimping axial direction, and the first crimping member assembled with the crimping head is located between the crimping head and the abutting member.

In an embodiment of the disclosure, the pair of abutting members includes a first abutting member and a second abutting member. The second abutting member is fixedly disposed on an inner wall of the second clamp body, and the first abutting member includes a sleeve and an abutting block. The sleeve is connected to the crimping assembly, the abutting block is movably disposed in the sleeve, the elastic member abuts between the abutting block and the sleeve, and the cable is adapted to be clamped between the abutting block and the second abutting member.

In an embodiment of the disclosure, the pair of abutting members includes a first abutting member and a second abutting member. The second abutting member is fixedly disposed on an inner wall of the second clamp body, the elastic member abuts between the inner wall of the second clamp body and the first abutting member, the first abutting member or the crimping assembly has a chute, and the first abutting member and the crimping assembly are slidably connected to each other through the chute.

In an embodiment of the disclosure, the pair of abutting members includes a first abutting member and a second abutting member. The second abutting member is fixedly disposed on an inner wall of the second clamp body, the elastic member abuts between the first abutting member and the second abutting member, the first abutting member or the crimping assembly has a chute, and the first abutting member and the crimping assembly are slidably connected to each other through the chute.

In an embodiment of the disclosure, the second clamp body has an internal structure configured to guide the crimping assembly and the cable stripping assembly to synchronously slide in a same direction along the crimping axial direction.

In an embodiment of the disclosure, the driving member has a variable aperture reaming hole, and the crimping hand tool further includes a variable shaft diameter pin. The variable shaft diameter pin penetrates the second clamp body and is correspondingly inserted into the variable aperture reaming hole, so as to engage or release the driving member.

In an embodiment of the disclosure, the crimping hand tool further includes a pair of second crimping members, which are respectively disposed on the first clamp body and the second clamp body, so as to move closer or away from each other following pivoting of the first clamp body and the second clamp body. The second crimping members forms at least one pressing groove, and a cable and a fixed wing are adapted to be placed in the pressing groove to be pressed together by the second crimping members.

In an embodiment of the disclosure, the second clamp body has a pair of slots, which are away from a pivotal joint of the first clamp body and the second clamp body, and the second crimping members are movably disposed in the slots. The pressing groove is located between the pivotal joint of the first clamp body and the second clamp body and the slots.

Based on the above, the crimping hand tool integrates the crimping assembly and the cable stripping assembly, which are both movably disposed in the second clamp body and driven by the driving member to perform the related crimping or cable stripping actions when the first and the second clamp bodies are pivoted relative to each other. The cable stripping assembly is pivotally connected to the crimping assembly to be driven together, the crimping slot and the stripping slot of the two are adjacent to each other and are located at the same end of the second clamp body. The end is away from the pivotal end of the first clamp body and the second clamp body, and the moving directions of the crimping assembly and the cable stripping assembly are the same. Therefore, it allows the user to use the same gesture to control the crimping hand tool to complete the crimping or the cable stripping actions, without having to switch to another part of the crimping hand tool, so as to improve the efficiency and convenience during operation of the crimping hand tool.

To make the abovementioned more comprehensible, several embodiments accompanied by drawings are described in detail as follows.

DESCRIPTION OF THE EMBODIMENTS

Figure 1A:
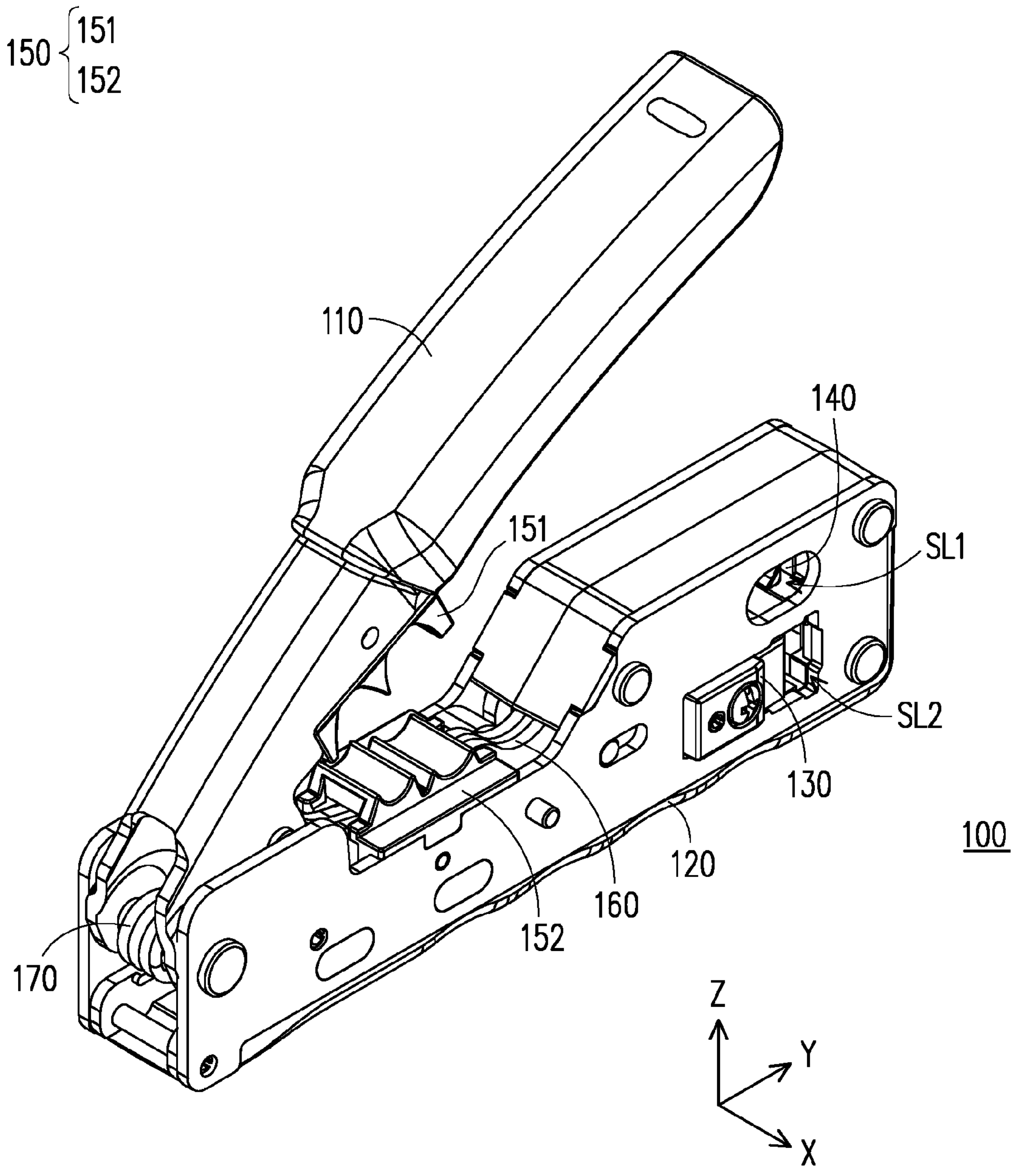
FIGS. 1A and 1B are respectively schematic views of a crimping hand tool in different viewing angles according to an embodiment of the disclosure.
Figure 1B:
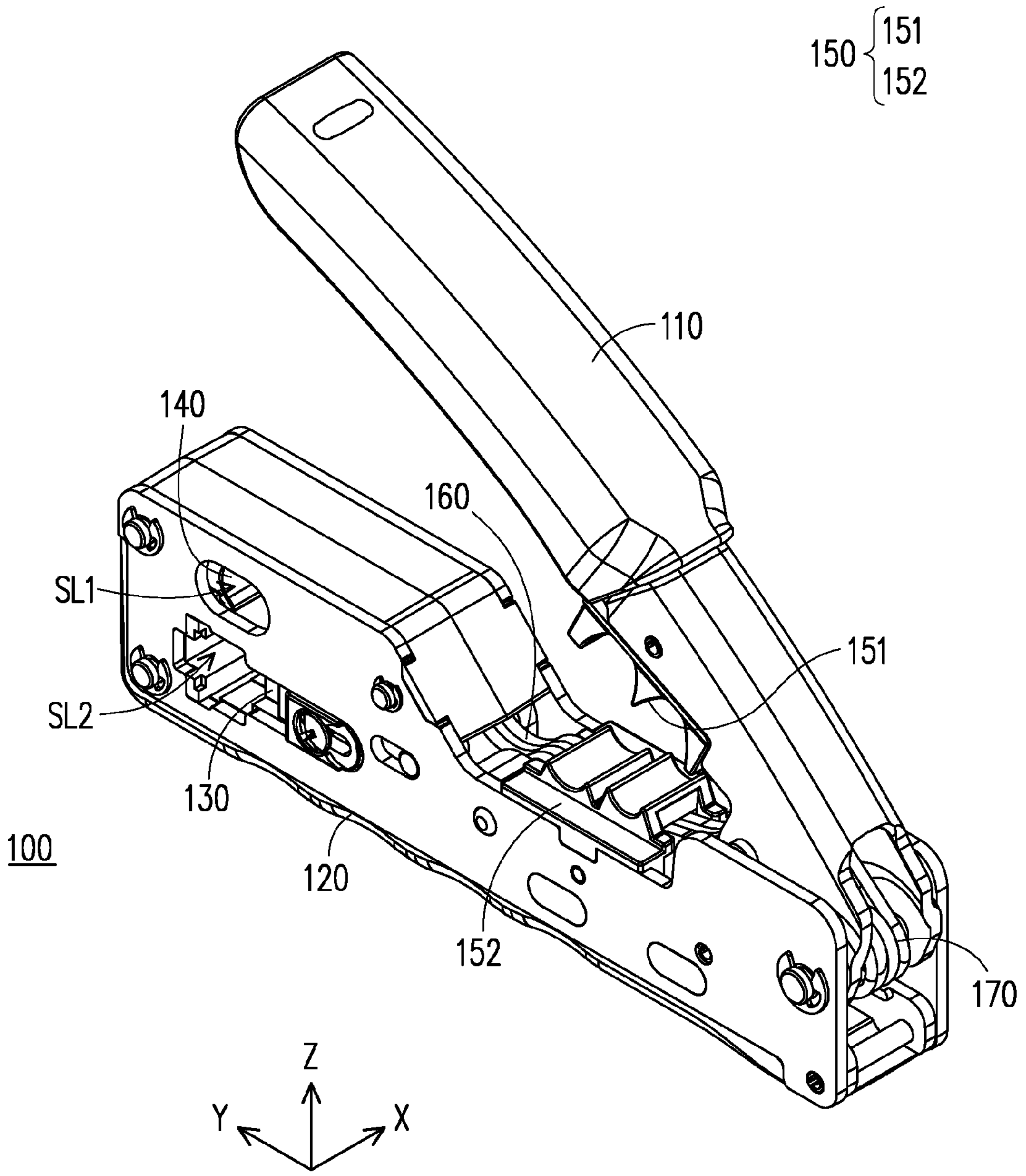
Figure 2A:
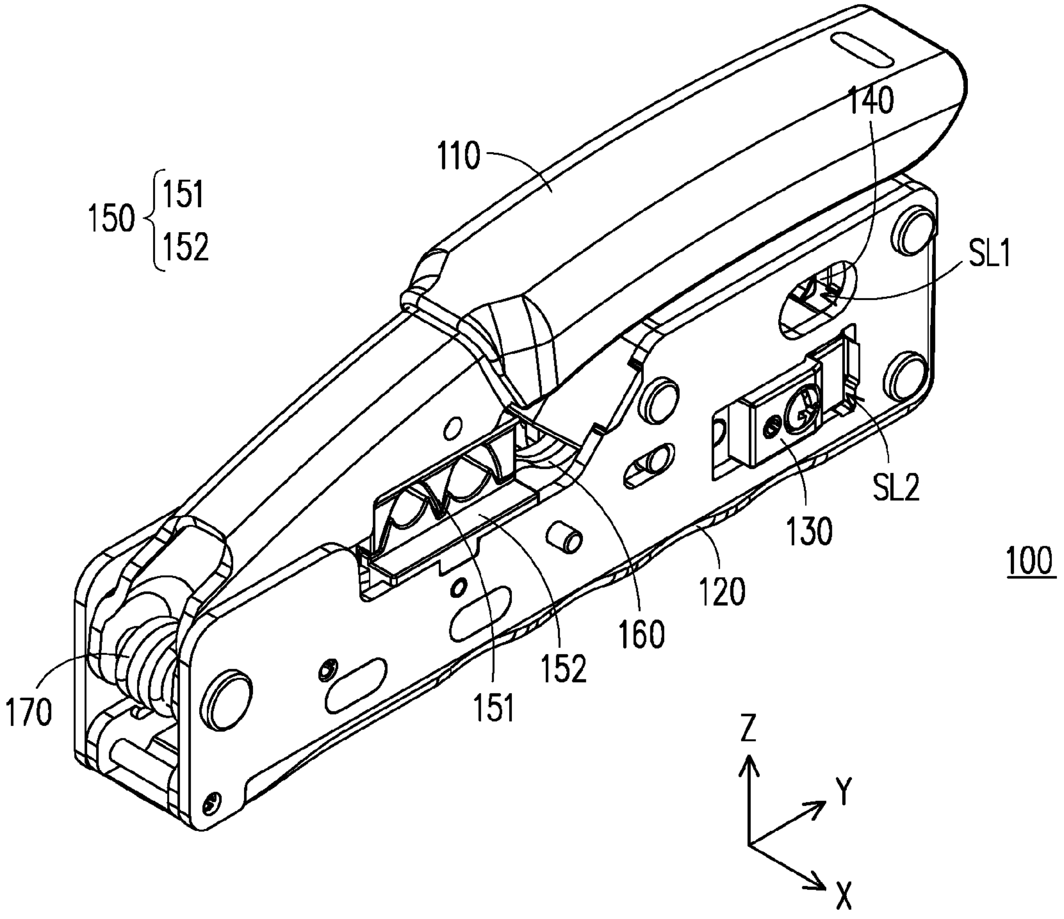
FIGS. 2A and 2B are respectively schematic views of the crimping hand tool in FIGS. 1A and 1B in another state.
Figure 2B:
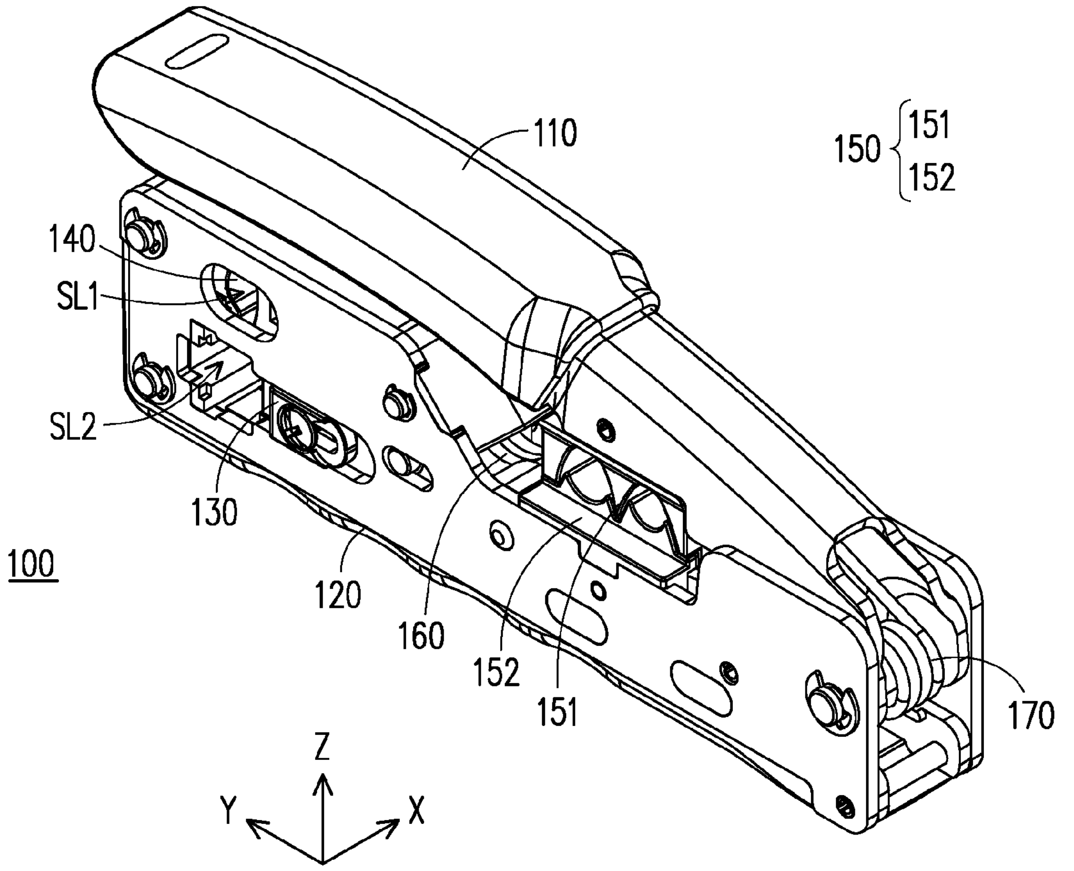

FIGS. 1A and 1B are respectively schematic views of a crimping hand tool in different viewing angles according to an embodiment of the disclosure, in which a crimping hand tool 100 is shown in a released state. FIGS. 2A and 2B are respectively schematic views of the crimping hand tool in FIGS. 1A and 1B in another state, in which the crimping hand tool 100 is shown in a crimping state. The embodiment also provides rectangular coordinates XYZ to facilitate description of components at the same time. With reference to FIGS. 1A to 2B concurrently, in the embodiment, the crimping hand tool 100 includes a first clamp body 110, a second clamp body 120, a driving member 160, a crimping assembly 130, and a cable stripping assembly 140. As some of the components are limited by the viewing angle or blocked by the other components and may only be partially identified, further explanation will follow.

Figure 3:
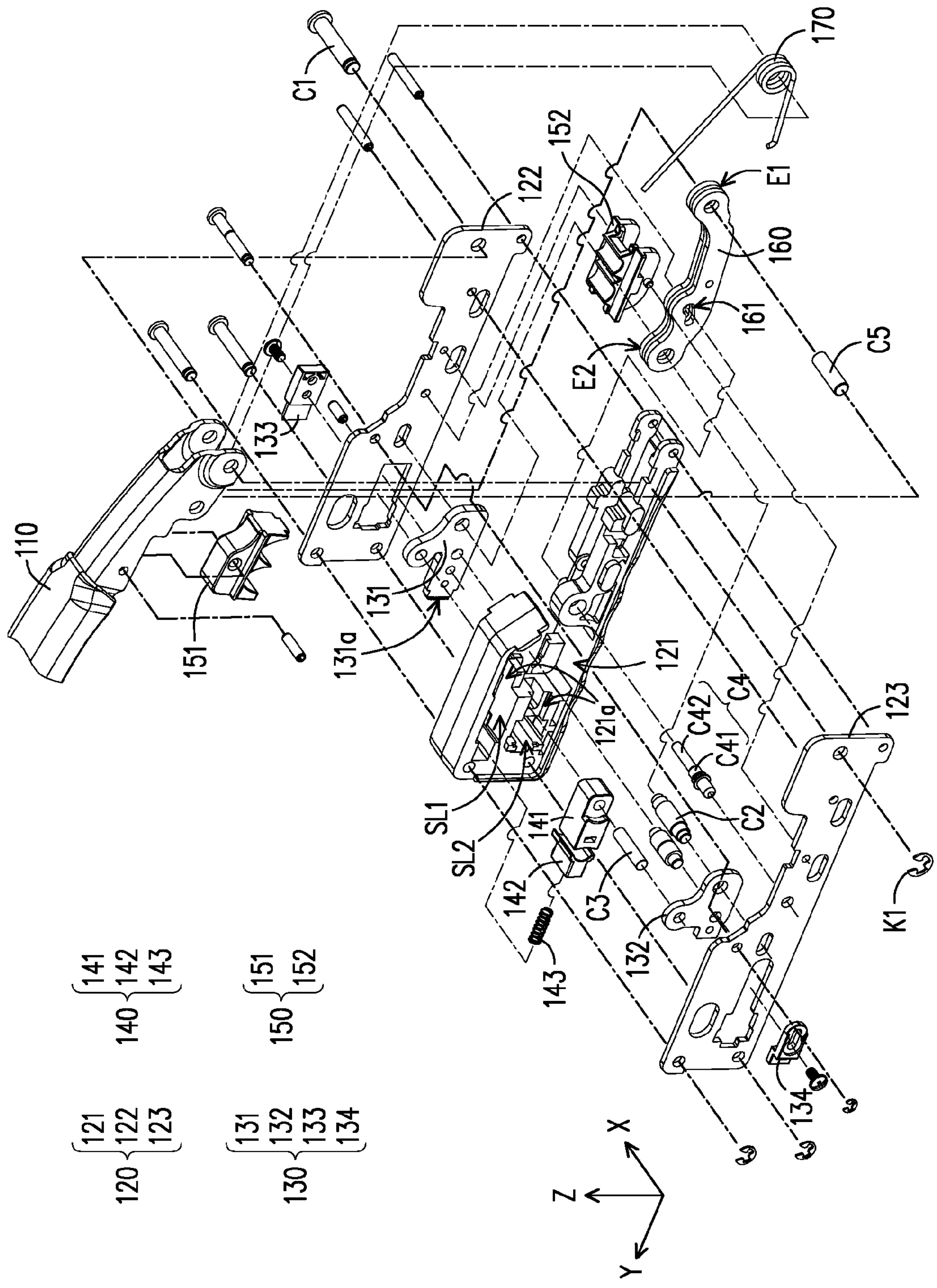
FIG. 3 is an exploded view of the crimping hand tool.

FIG. 3 is an exploded view of the crimping hand tool. With reference to FIG. 3, in the embodiment, the first clamp body 110 is pivotally connected to the second clamp body 120. The driving member 160 is movably disposed in the second clamp body 120, and one end E1 of the driving member 160 is pivotally connected to the first clamp body 110 by a pivotal connecting member C5. The crimping assembly 130 is movably disposed in the second clamp body 120 and is pivotally connected to another end E2 of the driving member 160. The cable stripping assembly 140 is movably disposed in the second clamp body 120 and is pivotally connected to the crimping assembly 130. A pivotal axial direction of the first clamp body 110 and the second clamp body 120, a pivotal axial direction of the driving member 160 and the first clamp body 110, a pivotal axial direction of the crimping assembly 130 and the driving member 160, and a pivotal axial direction of the cable stripping assembly 140 and the crimping assembly 130 are parallel to each other. The axial directions are all parallel to an X axis. The crimping assembly 130 and the cable stripping assembly 140 are driven by the driving member 160 to slide in a same direction when the first clamp body 110 and the second clamp body 120 are pivoted relative to each other. Here, the crimping assembly 130 and the cable stripping assembly 140 both move along a Y axis, and the crimping assembly 130 and the stripping assembly 140 move in a same positive Y axis direction during a transition from a released state shown in FIGS. 1A and 1B to a crimping state shown in FIGS. 2A and 2B, following driving by the driving member 160.

In detail, as shown in FIG. 3, the second clamp body 120 includes a base 121 and side plates 122 and 123 disposed on two opposite sides of the base 121 along the X axis. The first clamp body 110 and the second clamp body 120 are pivotally connected to each other by collocation of a pivotal connecting member C1 and a fastener K1, while allowing the pivotal connecting member C1 to pass through the elastic member 170 at the same time. The elastic member 170 abuts between the first clamp body 110 and the second clamp body 120 for resetting of the crimping hand tool 100 from the state shown in FIGS. 2A and 2B to the state shown in FIGS. 1A and 1B. Other pivotal connecting members or connecting members are similarly assembled with fasteners, which will not be repeated here.

Figure 4A:
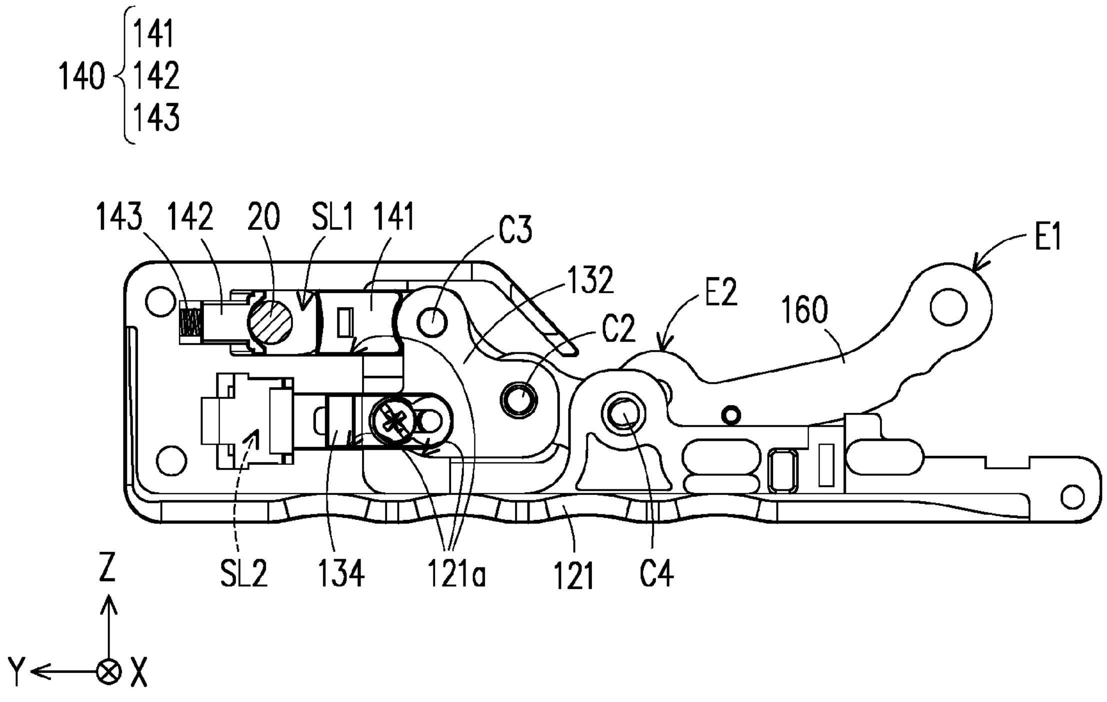
FIGS. 4A to 4C are respectively schematic views of some components of the crimping hand tool.
Figure 4B:
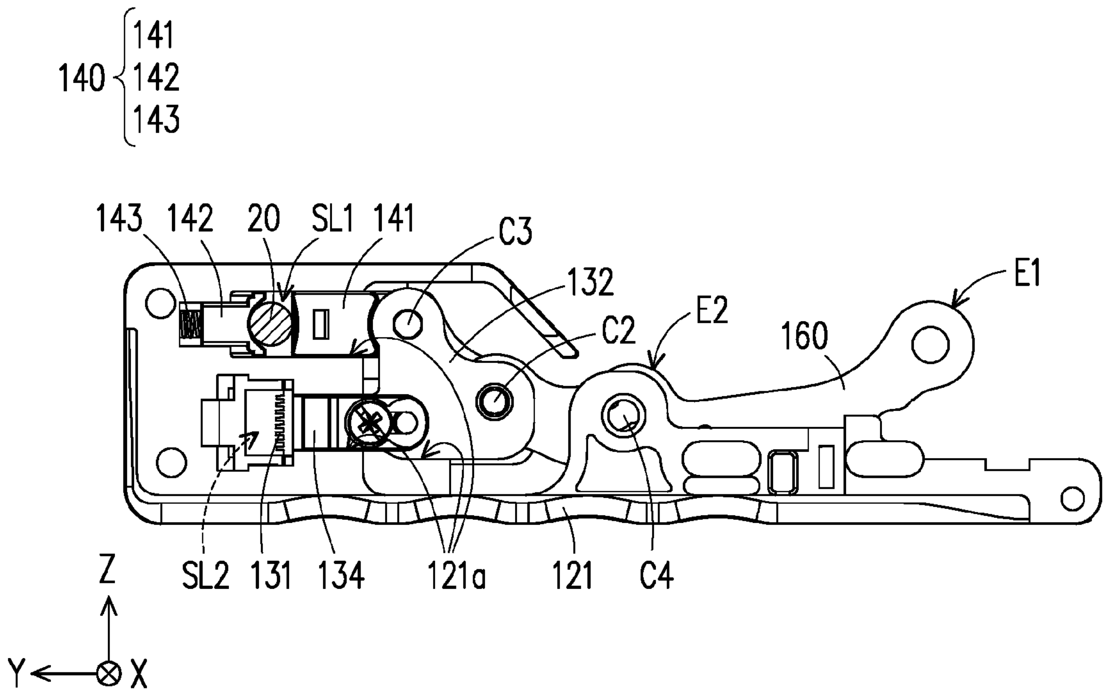
Figure 4C:
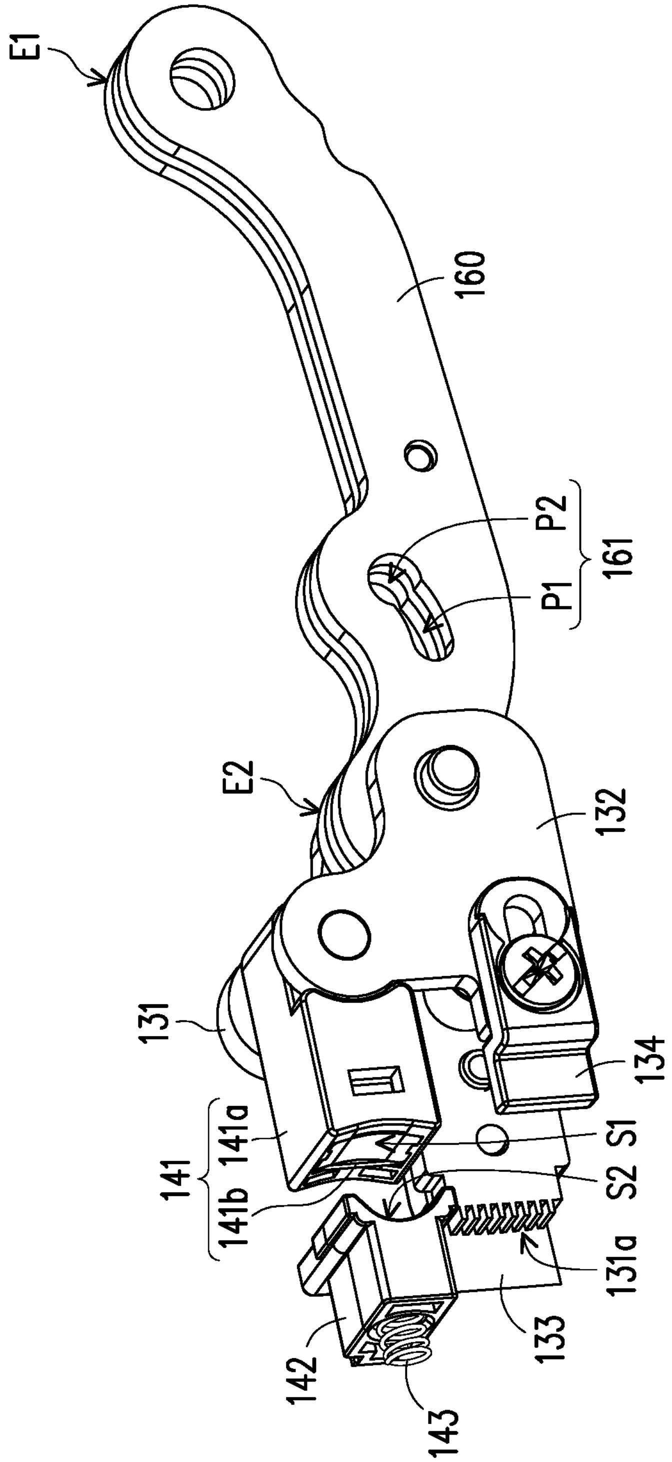

FIGS. 4A to 4C are respectively schematic views of some components of the crimping hand tool. With reference to FIGS. 3, 4A and 4B, in the embodiment, the crimping assembly 130 includes a pair of first crimping members 131 and 132, a cable cutter 133, and a crimping head 134. The first crimping members 131 and 132 are pivotally connected coaxially with the other end E2 of the driving member 160 by a pivotal connecting member C2. The cable cutter 133 is assembled on the first crimping member 131, and the crimping head 134 is assembled on the first crimping member 132, to enable the cable cutter 133 and the crimping head 134 are located on two opposite sides of the first crimping members 131 and 132 on the X axis. At the same time, the crimping assembly 130 is slidably located in a slot SL2 of the second clamp body 120 along the Y axis. That is, by inserting an object component to be crimped into the slot SL2, the crimping action may be performed along a crimping axial direction (that is, axial direction of the Y axis) by the crimping assembly 130, and related examples will be described in detail later.

Furthermore, as shown in FIG. 3, the crimping head 134 has a reaming hole extending along the Y axis, and a position of the crimping head 134 relative to the first crimping member 132 may be adjusted by collocation of a screw and the reaming hole. That is, in the crimping axial direction (equivalent to the axial direction of the Y axis in the embodiment), the crimping head 134 is an adjustable component, which is beneficial in adapting to the object component to be crimped. On the other hand, the second clamp body 120 shown in FIG. 3 has multiple internal structures, such as a guiding structure 121*a* (only one side of the base 121 is marked due to the viewing angle, and another side also has a relevant guiding structure configured to guide the first crimping member 131) or reaming holes located on the side plates 122 and 123. The guiding structure 121*a* is configured to guide the first crimping members 131 and 132, as well as the crimping head 134 and the cutter 133 to only move along the Y axis, so as to facilitate the crimping of the object component inserted into the slot SL2. The reaming holes on the side plates 122 and 123 may be configured to guide the pivotal connecting member C2 to move along the Y axis.

In addition, the cable stripping assembly 140 of the embodiment includes a pair of abutting members 141 and 142, and an elastic member 143. The abutting members 141 and 142 are slidably disposed in a slot SL1 of the second clamp body 120, and the abutting member 141 is connected to in-between of the first crimping members 131 and 132 through a connecting member C3, which is equivalent to having the first crimping member 131 located between the cable cutter 133 and the abutting members 141 and 142, and having the first crimping member 132 located between the crimping head 134 and the abutting members 141 and 142. Here, the abutting members 141 and 142 are also guided by the guiding structure 121*a* of the second clamp body 120 to smoothly slide along the Y axis, so as to strip the object component extended into the slot SL1, which will be described in detail later. It should also be noted that in FIG. 3, although only the slots SL1 and SL2 are marked on the base 121 of the second clamp body 120 as an example, but actually, the slots SL1 and SL2 are part of overall structural features of the second clamp body 120 (the base 121, the side plates 122 and 123).

With reference to FIGS. 4A to 4C concurrently, furthermore, the abutting member 141 of the embodiment includes a body 141*a* and a cable peeler 141*b*. The body 141*a* has a curved surface S1, and the cable peeler 141*b* is disposed at the curved surface S1. In contrast, the abutting member 142 is abutted against an inner wall of the second clamp body 120 through the elastic member 143, and the abutting member 142 has a curved surface S2 corresponding to the curved surface S1. As shown in FIG. 4B, after a cable 20 is placed in the slot SL1, a user drives the driving member 160 by pivoting and pressing the first clamp body 110 and the second clamp body 120 together. The abutting member 141 moves towards the abutting member 142 concurrently, as the first crimping members 131 and 132 (moving towards the positive Y axis direction) are pushed by the driving member 160, so as to clamp the cable 20 between the two curved surfaces S1 and S2. As shown in FIG. 4B, the elastic member 143 is located on a movement path of the abutting members 142, and the elastic member 143 substantially abuts between the inner wall of the second clamp body 120 and the abutting member 142, which enables the abutting member 142 to be in a floating state relative to the abutting member 141. This allows the abutting members 141 and 142 to adapt to the cable 20 with different outer diameters, and allows the elastic member 143 to provide buffering concurrently.

At the same time, the cable peeler 141*b* located on the curved surface S1 cuts into an outer insulation layer of the cable 20. The outer insulation layer may be removed by the cable peeler 141*b* and an internal core cable of the cable 20 is exposed after the crimping hand tool 100 and the cable are rotated relative to each other, which will also be described in detail later. In other words, as shown in FIG. 4C, the crimping assembly 130 and the cable stripping assembly 140 are driven by the driving member 160 to slide in the same direction. This effectively simplifies the posture and action (and enables the crimping action and the stripping action to be substantially the same action) required by the user during operation of the crimping hand tool, so as to provide convenience to the user and meet requirements. In another embodiment that is not shown, the cable peeler 141*b* may also be disposed in the abutting member 142, which may also perform the required stripping function.

It should also be noted that, with reference to FIGS. 3 and 4C again, in the embodiment, the driving member 160 has a variable aperture reaming hole 161, and the crimping hand tool 100 further includes a variable shaft diameter pin C4. The variable shaft diameter pin C4 penetrates the second clamp body 120 and is correspondingly inserted into the variable aperture reaming hole 161, so as to engage or release the driving member 160. In other words, the variable aperture reaming hole 161 includes a hole P1 and a hole P2 with different inner diameters. The inner diameter of the hole P2 is greater than the inner diameter of the hole P1. Correspondingly, the variable shaft diameter pin C4 includes a section C41 and a section C42. Outer diameter of the section C41 is greater than that of the section C42, and the outer diameter of the section C41 is greater than the inner diameter of the hole P1, and the outer diameter of the section C42 is smaller than the inner diameter of the hole P1.

In this way, the driving member 160 does not interfere with the variable shaft diameter pin C4 when the variable shaft diameter pin C4 is inserted into the variable aperture reaming hole 161 with its section C42, therefore the user may smoothly control the crimping hand tool 100 to perform crimping or releasing at this time. However, once the crimping hand tool 100 performs the crimping action as shown in FIG. 4B and enables the variable shaft diameter pin C4 to be inserted into the section C41 of the variable aperture reaming hole 161, the difference between the inner diameter and the outer diameter generates an interference between the components, which fixes and maintains the driving member 160 at this time in the state shown in FIG.

4B until the section C41 of the variable shaft diameter pin C4 is replaced by the section C42 of the variable shaft diameter pin C4, and the interference is released. The driving member 160 is fixed and maintained in the state shown in FIG. 4B, which facilitates operation of the crimping hand tool 100 to perform the stripping action by the user, which helps to save labor, and spares the user from spending additional effort in maintaining the crimping state shown in 4B when stripping.

Figure 4D:
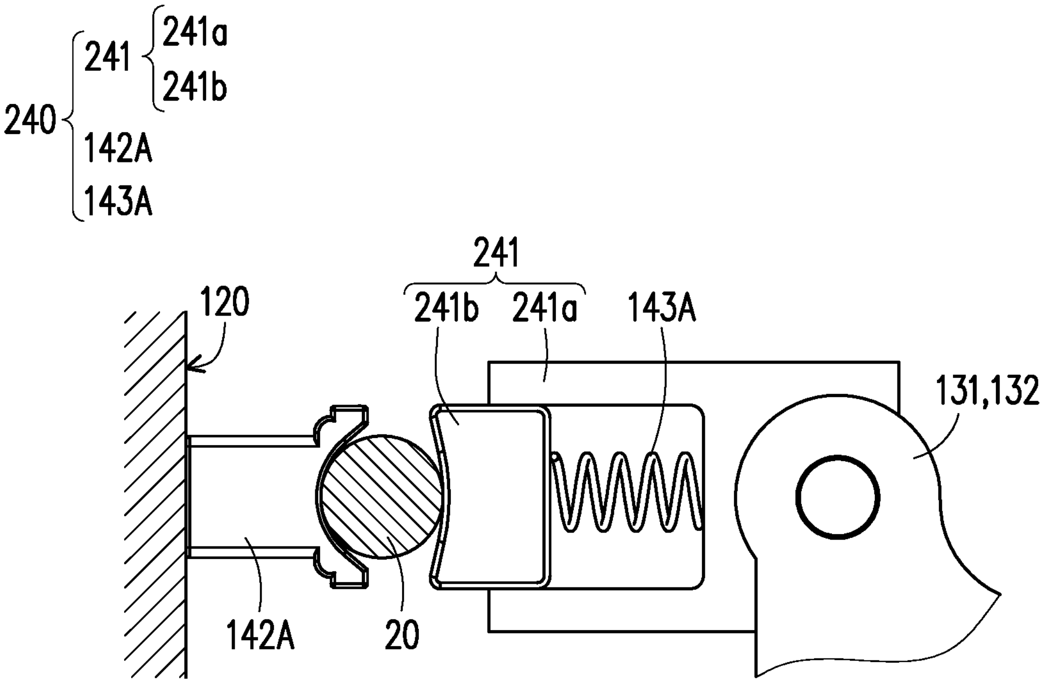
FIGS. 4D, 4E, and 4F are respectively simple schematic views of cable stripping assemblies according to different embodiments of the disclosure.
Figure 4E:
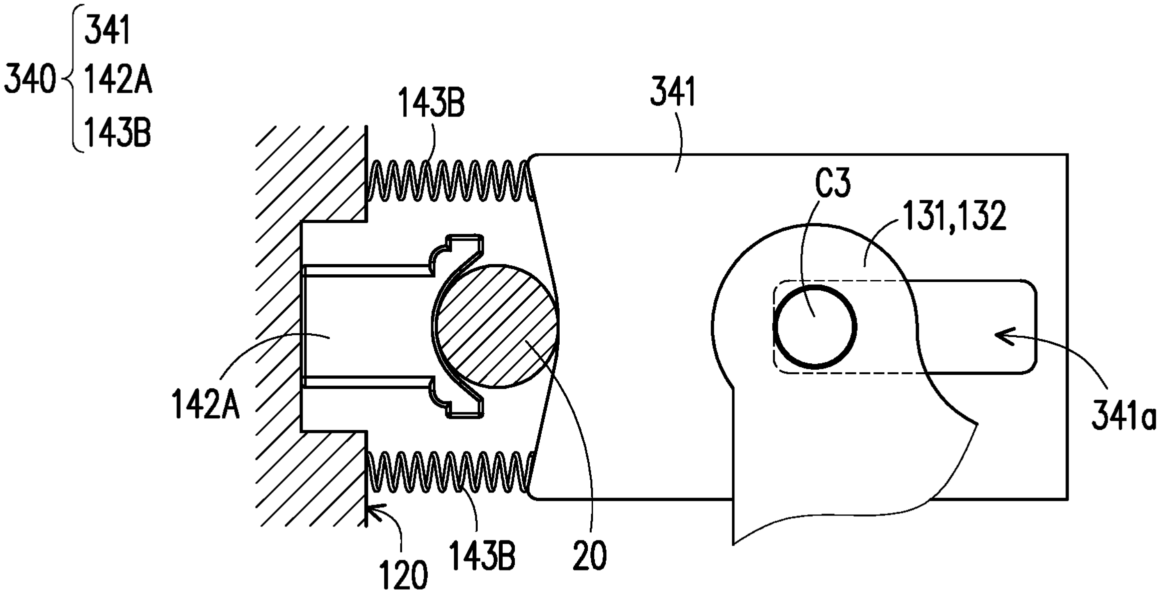
Figure 4F:
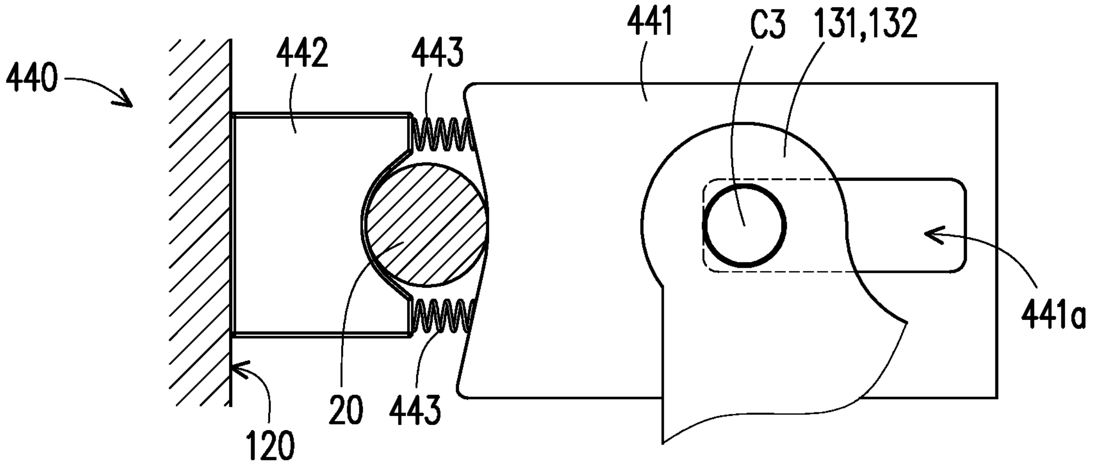

FIGS. 4D, 4E, and 4F are respectively simple schematic views of cable stripping assemblies according to different embodiments of the disclosure. With reference to FIG. 4D first, in the embodiment, a cable stripping assembly 240 includes abutting members 241 and 142A, and an elastic member 143A. The abutting member 142A is disposed on the inner wall of the second clamp body 120, the abutting member 241 includes a sleeve 241*a* and an abutting block 241*b*. The sleeve 241*a* is connected to the first crimping members 131 and 132 of the crimping assembly 130, and the elastic member 143A abuts between an inner wall of the sleeve 241*a* and the abutting block 241*b*, to allow the abutting block 241*b* to float relative to the abutting member 142A, thereby smoothly clamping the cable 20 to perform the same action as the foregoing embodiment.

With reference to FIG. 4E, a cable stripping assembly 340 of the embodiment includes abutting members 142A and 341 and an elastic member 143B. The abutting member 142A is disposed on the inner wall of the second clamp body 120, the abutting member 341 is connected to the first crimping members 131 and 132 of the crimping assembly 130, and the elastic member 143B abuts between the abutting member 341 and the inner wall of the second clamp body 120, to allow the abutting member 341 to float relative to the abutting member 142A, thereby clamping the cable 20.

In addition, the abutting member 341 of the embodiment also has a chute 341*a*. The abutting member 341 and the crimping assembly 130 (the first crimping members 131 and 132) are slidably connected to each other through the connecting member C3 and the chute 341*a*. When performing the cable stripping action, the user presses the first clamp body 110 and the second clamp body 120 together, and enables the driving member 160 to push the abutting member 341 through the crimping assembly 130 (the first crimping members 131 and 132) and the connecting member C3 to move the abutting member 341 toward left side of FIG. 4E, so as to clamp the cable 20 between the abutting members 341 and 142A, and deform (compress) the elastic member 143B concurrently. When the user no longer applies pressure to the first clamp body 110 and the second clamp body 120 and allows both to unfold, the crimping assembly 130 (the first crimping members 131 and 132) and the connecting member C3 moves toward right side of FIG. 4E following the driving member 160. At this time, the elastic member 143B is no longer under pressure and its elastic force is allowed to drive the abutting member 341 to the right side. This causes the crimping assembly 130 (the first crimping members 131 and 132) and the connecting member C3 to be continuously abutting to a left end of the chute 341*a*, so as to prevent existence of an empty stroke between the abutting member 341 and the crimping assembly 130, and maintain compactness of the movement of the components. In another contemplated embodiment that is not shown, the chute may be modified to be disposed on the crimping assembly 130 (the first crimping members 131 and 132), which may also produce the same compact motion as described above.

With reference to FIG. 4F, a cable stripping assembly 440 of the embodiment includes abutting members 441 and 442, and an elastic member 443. The abutting member 442 is disposed on the inner wall of the second clamp body 120, the abutting member 441 is connected to the first crimping members 131 and 132 of the crimping assembly 130, and the elastic member 443 abuts between the abutting members 441 and 442, which may also cause the abutting member 441 to float relative to the abutting member 442 and smoothly clamp the cable 20. In the embodiment, the abutting member 441 has a chute 441*a*, and the abutting member 441 and the crimping assembly 130 (the first crimping members 131, 132) are slidably connected to each other through the connecting member C3 and the chute 441*a*, which generates the same compact motion as the embodiment shown in FIG. 4E.

Figure 5A:
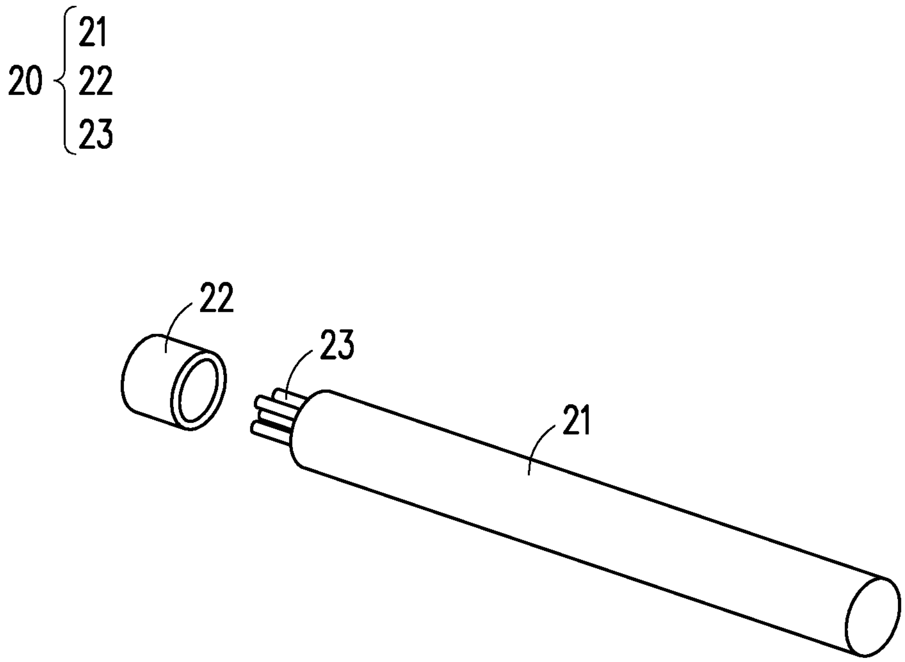
FIGS. 5A to 5D illustrate a processing process of a cable connector.

FIGS. 5A to 5D illustrate a processing process of a cable connector, that is, the cable 20 and a connector 30 are combined together by the crimping hand tool 100. With reference to FIG. 5A first, here, outer insulation layers 21 and 22 of the cable 20 are to be partially removed (the outer insulation layer 22 is removed) to expose a core cable 23 that is wrapped inside. Therefore, with reference to the cable stripping assemblies 140, 240, 340, and 440 described in FIGS. 4A to 4G, that is to say, after the cable 20 is extended into the slot SL1 and a proper position is obtained, the pressing action may be performed to allow the cable peeler 141*b* embedded in one of the abutting members 141, 241, 341, and 441 to cut into the outer insulation layers 21 and 22, and then smoothly removing the outer insulation layer 22 after rotating along circumference of the cable 20.

Figure 5B:
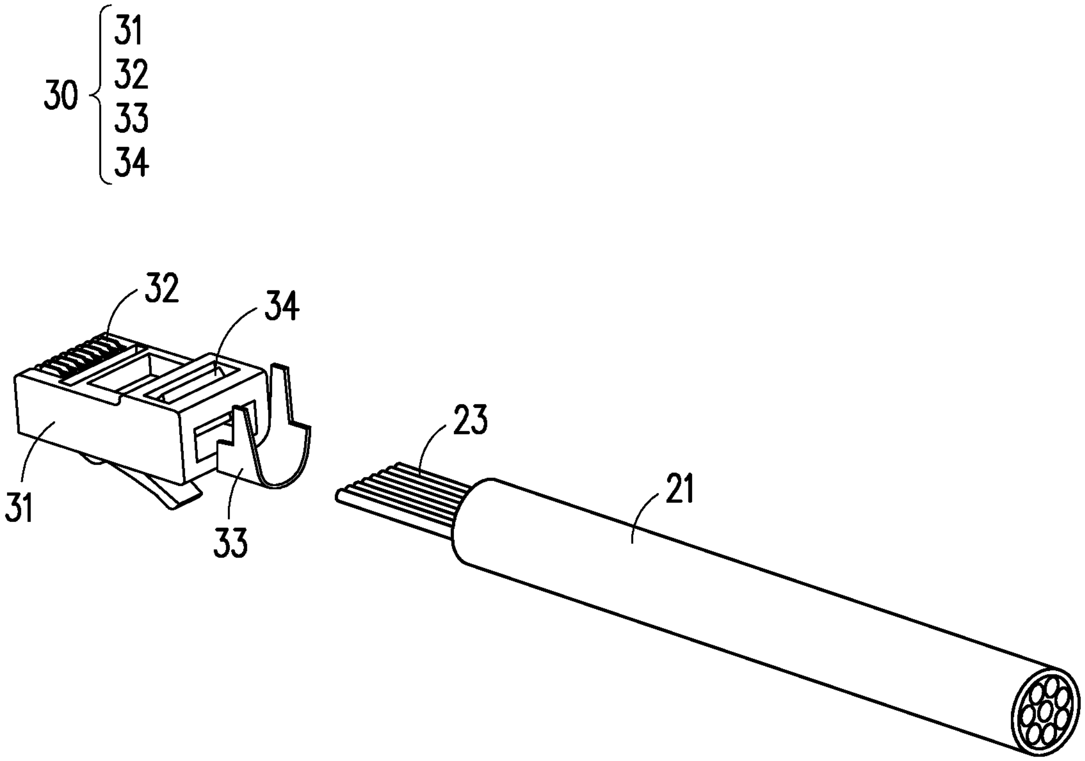

Next, with reference to FIG. 5B, the exposed core cable 23 is adapted to be inserted into a connector body 31 from one side of the connector body 31 through a fixed wing 33, and a portion of the core cable 23 is exposed from another side of the connector body 31. Therefore, the next action is to crimp the connector 30 and the cable 20 together with the crimping hand tool 100. Accordingly, with reference to FIGS. 5C and 5D, the user first places the connector 30 in FIG. 5C and the cable 20 into the slot SL2 of the crimping hand tool 100, and then presses the first clamp body 110 and the second clamp body 120, as shown in FIG. 3. The first crimping member 131 has a crimping portion 131*a*, which moves into the slot SL2, as shown in FIG. 5D, to cause a conductive sheet 32 of the connector 30 to penetrate through the outer insulation layer 21 of the cable 20 to be electrically connected to the core cable 23, so as to complete the crimping action. Here, one of the conductive sheets 32 in FIG. 5C is removed from the connector body 31 to facilitate identification.

Figure 5C:
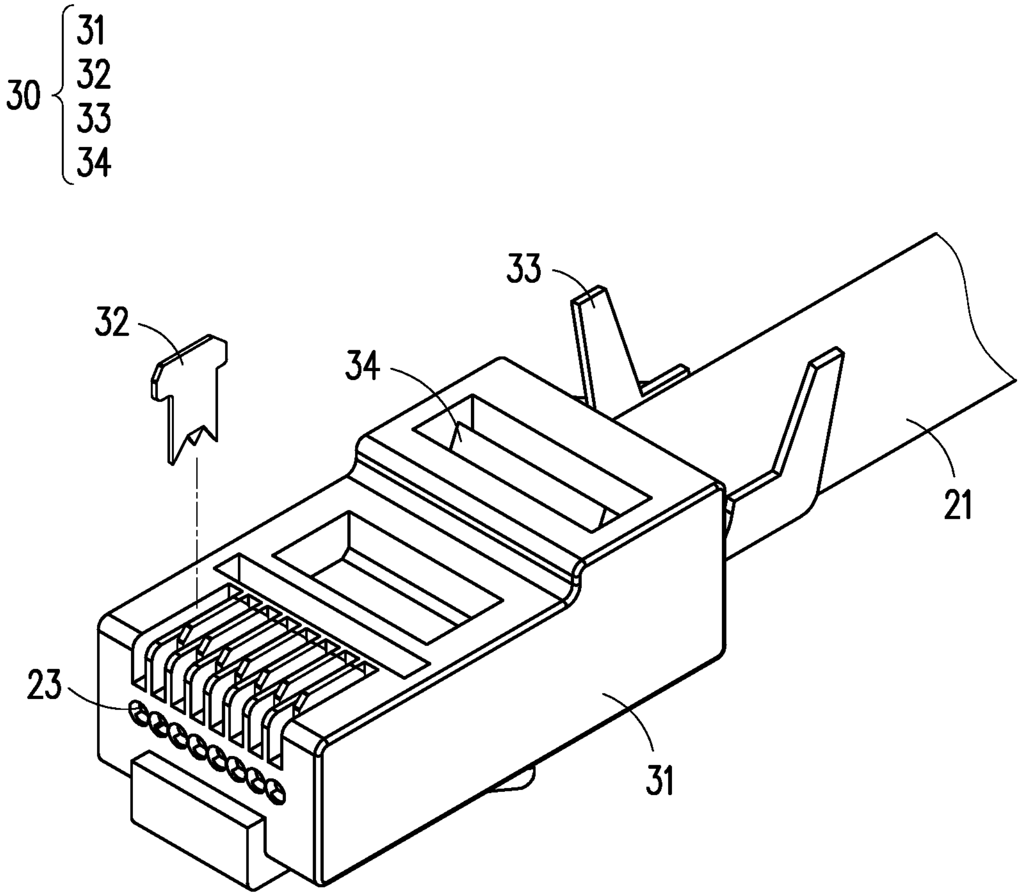
Figure 5D:
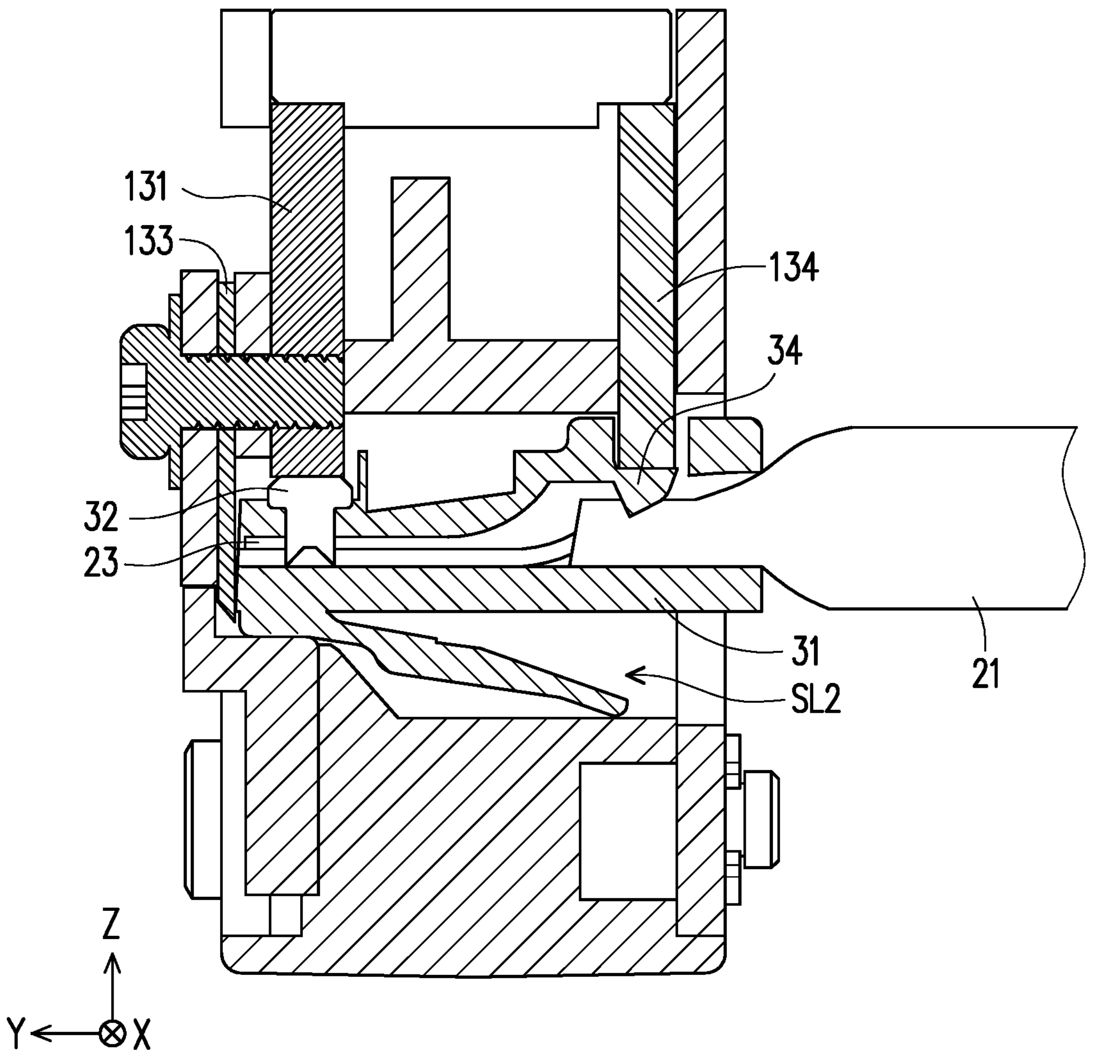

Furthermore, the exposed portion of the core cable 23 in FIG. 5C is cut off by the cable cutter 133 falling down along an outer surface of the connector body 31 during the crimping operation. At the same time, the crimping head 134 also abuts the crimping block 34 against the outer insulation layer 21 of the cable 20. This allows the user to crimp the connector 30 and the cable 20 together with a single crimping action by the crimping hand tool 100.

With reference to FIG. 3 again, in the embodiment, a second crimping assembly 150 of the crimping hand tool 100 includes a pair of second crimping members 151 and 152, which are respectively disposed on the first clamp body 110 and the second clamp body 120, so as to move closer or away from each other following the pivoting of the first clamp body 110 and the second clamp body 120. The pair of second crimping members 151 and 152 form at least one pressing groove (two pressing grooves are shown in FIG. 3), so that the cable 20 and the fixed wing 33 are driven by the pair of second crimping members 151 and 152 to be pressed together, after the cable 20 and the fixed wing 33 are placed in the pressing groove.

Figure 6A:
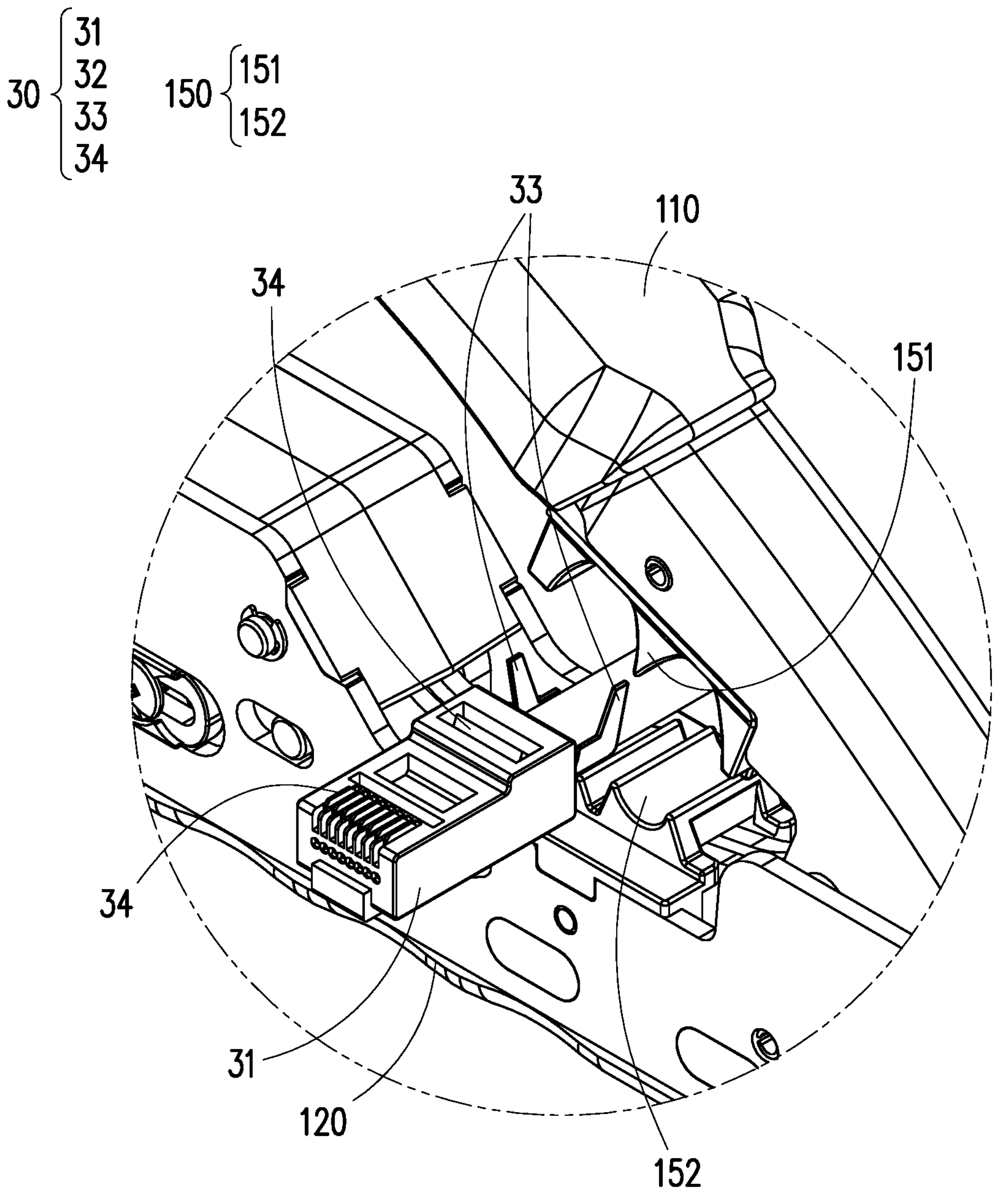
FIGS. 6A and 6B are respectively partial schematic views of the crimping hand tool.
Figure 6B:
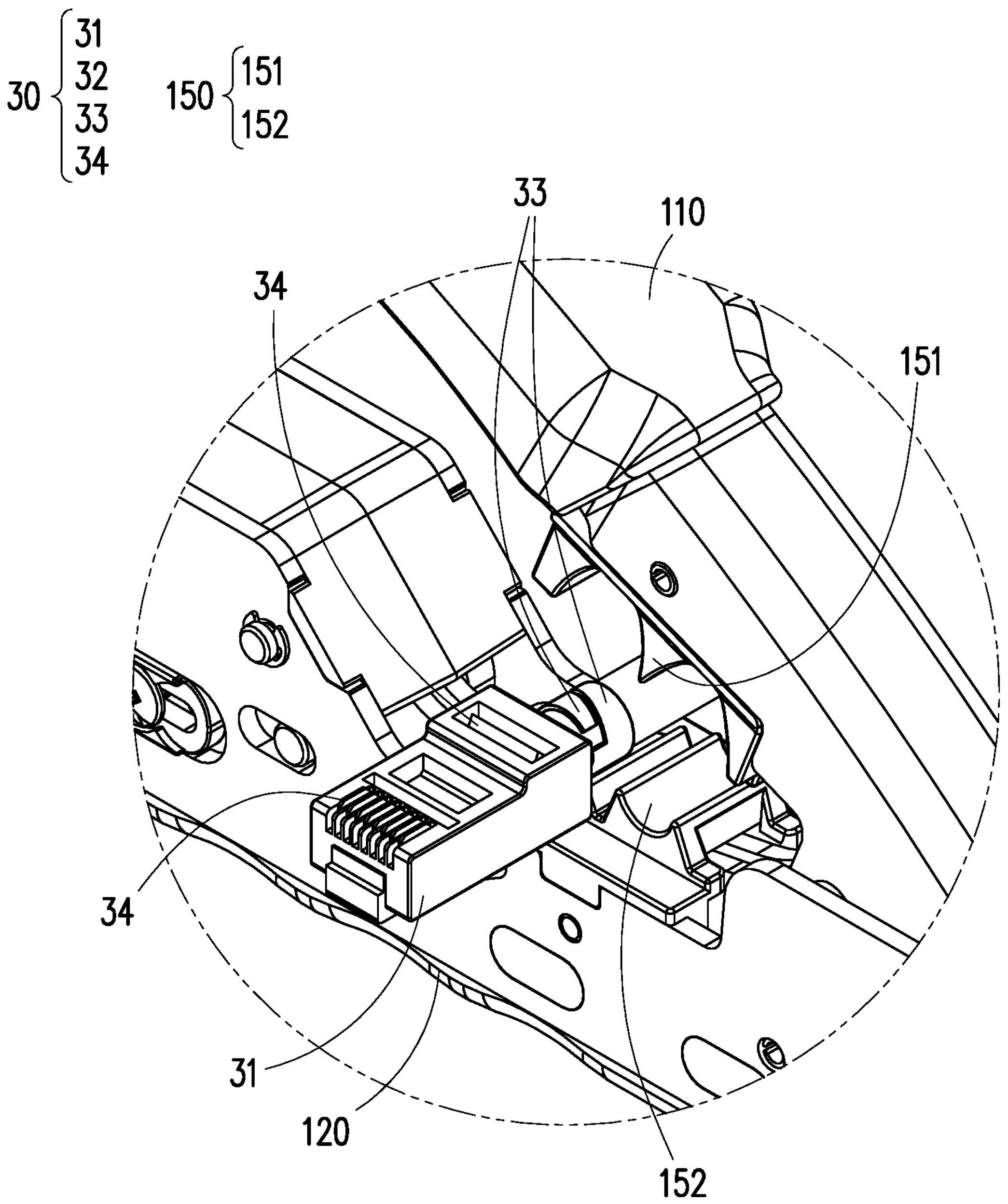

In detail, FIGS. 6A and 6B are respectively partial schematic views of the crimping hand tool. In continuation of the crimping process in FIGS. 5A to 5D, with reference to FIGS. 5C, 6A, and 6B concurrently, in the embodiment, a final step of crimping the connector 30 and the cable 20 is shown in FIGS. 6A and 6B. The fixed wing 33 is fixed on the outer insulation layer 21 of the cable 20 by the crimping hand tool 100 to ensure that a connection state between the connector 30 and the cable 20 is stable and not loose. This allows completion of all steps involved in the crimping action of the connector 30 and the cable 20.

In summary, in the embodiment of the disclosure, the crimping hand tool integrates the crimping assembly and the cable stripping assembly, which are both movably disposed in the second clamp body and driven by the driving member to perform the related crimping or cable stripping actions when the first and the second clamp bodies are pivoted relative to each other. The cable stripping assembly is pivotally connected to the crimping assembly to be driven together, the crimping slot and the stripping slot of the two are adjacent to each other and are located at the same end of the second clamp body. The end is away from the pivotal end of the first clamp body and the second clamp body, and the moving directions of the crimping assembly and the cable stripping assembly are the same. Therefore, it allows the user to use the same gesture to control the crimping hand tool to complete the crimping or the cable stripping actions, without having to switch to another part of the crimping hand tool, so as to improve the efficiency and convenience during operation of the crimping hand tool.

Although the disclosure has been described with reference to the abovementioned embodiments, but it is not intended to limit the disclosure. It is apparent that any one of ordinary skill in the art may make changes and modifications to the described embodiments without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A crimping hand tool, comprising:

a first clamp body;

a second clamp body, pivotally connected to the first clamp body;

a driving member, movably disposed in the second clamp body, and one end of the driving member is pivotally connected to the first clamp body;

a crimping assembly, movably disposed in the second clamp body, and pivotally connected to another end of the driving member; and a cable stripping assembly, movably disposed in the second clamp body and connected to the crimping assembly, wherein a pivotal axial direction of the first clamp body and the second clamp body, a pivotal axial direction of the driving member and the first clamp body, and a pivotal axial direction of the crimping assembly and the driving member, and a connection axial direction of the cable stripping assembly and the crimping assembly are parallel to each other, and the crimping assembly and the cable stripping assembly are driven by the driving member to slide in a same direction when the first clamp body and the second clamp body pivot relative to each other, wherein the cable stripping assembly comprises:

a pair of abutting members slidably disposed in a slot of the second clamp body, and one of the pair of abutting members is connected to the crimping assembly;

a cable peeler embedded in one of the pair of abutting members; and an elastic member disposed on a movement path of the pair of abutting members, and the crimping assembly is pushed by the driving member through pivoting of the first clamp body and the second clamp body relative to each other, and the pair of abutting members are driven to move closer to each other after a cable which is adapted to be inserted into the slot is inserted into the slot, so as to enable the cable to be clamped between the pair of abutting members.

2. The crimping hand tool according to claim 1, wherein the elastic member abuts between one of the pair of abutting members and the second clamp body.

3. The crimping hand tool according to claim 1, wherein the elastic member abuts between one of the pair of abutting members and the crimping assembly.

4. The crimping hand tool according to claim 1, wherein the elastic member abuts between the pair of abutting members.

5. The crimping hand tool according to claim 1, wherein the crimping assembly comprises a pair of first crimping members, which are movably disposed in another slot of the second clamp body, and are pivotally connected to the other end of the driving member coaxially, and one of the abutting members is pivotally connected to in-between of the pair of first crimping members.

6. The crimping hand tool according to claim 5, wherein the crimping assembly further comprises a cable cutter, which is assembled on one of the pair of first crimping members, and the first crimping member assembled with the cable cutter is located between the cable cutter and the abutting member.

7. The crimping hand tool according to claim 5, wherein the crimping assembly further comprises a crimping head, which is adjustably assembled on one of the pair of first crimping members along a crimping axial direction, and the first crimping member assembled with the crimping head is located between the crimping head and the abutting member.

8. The crimping hand tool according to claim 1, wherein the pair of abutting members comprises a first abutting member and a second abutting member, the second abutting member is fixedly disposed on an inner wall of the second clamp body, the first abutting member comprises a sleeve and an abutting block, the sleeve is connected to the crimping assembly, the abutting block is movably disposed in the sleeve, the elastic member abuts between the abutting block and the sleeve, and the cable is adapted to be clamped between the abutting block and the second abutting member.

9. The crimping hand tool according to claim 1, wherein the pair of abutting members comprises a first abutting member and a second abutting member, the second abutting member is fixedly disposed on an inner wall of the second clamp body, the elastic member abuts between the inner wall of the second clamp body and the first abutting member, the first abutting member or the crimping assembly comprises a chute, and the first abutting member and the crimping assembly are slidably connected to each other through the chute.

10. The crimping hand tool according to claim 1, wherein the pair of abutting members comprises a first abutting member and a second abutting member, the second abutting member is fixedly disposed on an inner wall of the second clamp body, the elastic member abuts between the first abutting member and the second abutting member, the first abutting member or the crimping assembly comprises a chute, and the first abutting member and the crimping assembly are slidably connected to each other through the chute.

11. The crimping hand tool according to claim 1, wherein the second clamp body comprises an internal structure configured to guide the crimping assembly and the cable stripping assembly to synchronously slide in a same direction along a crimping axial direction.

12. The crimping hand tool according to claim 1, wherein the driving member comprises a variable aperture reaming hole, and the crimping hand tool further comprises a variable shaft diameter pin, and the variable shaft diameter pin penetrates the second clamp body and is correspondingly inserted into the variable aperture reaming hole, so as to engage or release the driving member.

13. The crimping hand tool according to claim 1, wherein the crimping hand tool further comprises a pair of second crimping members, which are respectively disposed on the first clamp body and the second clamp body, so as to move closer or away from each other following pivoting of the first clamp body and the second clamp body, the pair of second crimping members forms at least one pressing groove, and the cable and a fixed wing are adapted to be placed in the pressing groove to be pressed together by the pair of second crimping members.

14. The crimping hand tool according to claim 13, wherein the second clamp body comprises a pair of slots, which are away from a pivotal joint of the first clamp body and the second clamp body, the pair of second crimping members are movably disposed in the pair of slots, the pressing groove is located between the pivotal joint of the first clamp body and the second clamp body and the pair of slots.

* * * * *